United States Patent [19]

Yanagisawa et al.

[11] Patent Number: 5,231,204

[45] Date of Patent: Jul. 27, 1993

[54] METHOD FOR PREVENTING COLORATION OF ORGANOSILICON COMPOUND

[75] Inventors: Hideyoshi Yanagisawa; Masaaki Yamaya, both of Gunma, Japan

[73] Assignee: Shin-Etsu Chemical Co., Ltd., Tokyo, Japan

[21] Appl. No.: 941,019

[22] Filed: Sep. 4, 1992

[30] Foreign Application Priority Data

Sep. 4, 1991 [JP] Japan .................................. 3-252989

[51] Int. Cl.⁵ ............................................... C07F 7/08
[52] U.S. Cl. .................................................. 556/401
[58] Field of Search ........................................ 556/401

[56] References Cited

U.S. PATENT DOCUMENTS

| | | | |
|---|---|---|---|
| 2,389,802 | 11/1945 | McGregor et al. | 556/401 |
| 2,698,836 | 1/1955 | Morrell | 556/401 X |
| 3,953,072 | 4/1976 | Yonemitsu et al. | 260/874 |
| 4,469,606 | 9/1984 | Reid et al. | 252/8.8 |
| 4,927,948 | 5/1990 | Bernhardt et al. | 556/401 |

FOREIGN PATENT DOCUMENTS 0102321 3/1984 European Pat. Off. .
2454124 5/1975 Fed. Rep. of Germany .

Primary Examiner—Paul F. Shaver
Attorney, Agent, or Firm—Millen, White, Zelano & Branigan

[57] ABSTRACT

A novel and simple method is proposed for preventing coloration of an organosilicon compound at an elevated temperature or under irradiation with light. The method comprises admixing the organosilicon compound with a specific aromatic adjuvant compound represented by the general formula

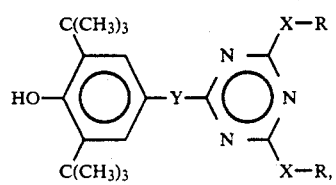

in which each R is, independently from the other, a monovalent hydrocarbon group and X and Y are each, independently from the others, a divalent group or atom selected from the class consisting of —NH—, —S— and —O—.

5 Claims, No Drawings

METHOD FOR PREVENTING COLORATION OF ORGANOSILICON COMPOUND

BACKGROUND OF THE INVENTION

The present invention relates to a method for preventing coloration of an organosilicon compound or, more particularly, to a method for preventing coloration of an organosilicon compound even at an elevated temperature or under intense light so that the organosilicon compound thus prevented from coloration is useful as an additive to or as a treatment agent of a white or colorless material such as fillers, fibers, resins and the like.

It is a trend in recent years that organosilicon compounds such as organosilanes and organopolysiloxanes are modified by introducing various kinds of functional groups into the molecular structure so as to impart the compound with improved compatibility or reactivity with various kinds of fillers, fibers, resins and the like for which the organosilicon compound is an additive or a treatment agent. When the organosilicon compound is an organopolysiloxane, it has a structure represented, for example, by the general formula

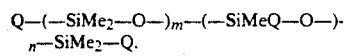

in which Me is a methyl group, each Q is, independently from the others, a monovalent hydrocarbon group or a functional organic group such as alkoxy, acyloxy, (meth)acryloxyalkyl, aminoalkyl, glycidyloxyalkyl, halogenoalkyl, mercaptoalkyl, amidoalkyl and polyoxyalkylene-containing alkyl groups, at least one of the groups denoted by Q being such a functional organic group, and the subscripts m and n are each zero or a positive integer with the proviso that m+n is not zero. When the organosilane compound is an organosilane, it is represented by the general formula

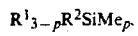

in which $R^1$ is a hydrolyzable group such as alkoxy, acyloxy and amino groups, $R^2$ is an organic group including alkyl, alkenyl, (meth)acryloxy, amino, amido, urea, epoxy, amino hydrochloride, halogenoalkyl, mercapto and polyoxyalkylene groups and p is 0, 1 or 2.

One of the problems in the use of these functional organosilicon compounds is that the compound is sometimes colored due to the content of a small amount of coloring impurities entering the compound in the course of the synthetic preparation of the compound or as a result of the reaction taking place in the modifying functional groups at an elevated temperature or under exposure to intense light. Once the organosilicon compound is colored, it follows that the material admixed or treated with such a colored organosilicon compound is also colored resulting in a great decrease in the commercial value of the product. Nevertheless, no very effective method is known for preventing coloration of an organosilicon compound.

This problem is particularly serious when the functional group is an aminoalkyl group, which is optionally in the form of a salt with an inorganic halogen-containing acid, or a methacryloxyalkyl group since these groups are liable to be decomposed under the influences of heat and light. In this regard, coloration of an organosilicon compound may be caused when the compound is synthesized in a process in which an amino compound or a hydrochloride is involved as an auxiliary reactant or a product derived therefrom.

SUMMARY OF THE INVENTION

The present invention accordingly has an object to provide a novel and very simple method for preventing coloration of an organosilicon compound to exhibit such a very remarkable effect as not to be obtained in any prior art methods.

Thus, the method of the present invention for the prevention of coloration of an organosilicon compound, which is, particularly, an organosilane compound having, more particularly, at least one amino-substituted or methacryloxy-substituted hydrocarbon group in a molecule, comprises: admixing the organosilicon compound with, as an adjuvant, an aromatic compound represented by the general formula

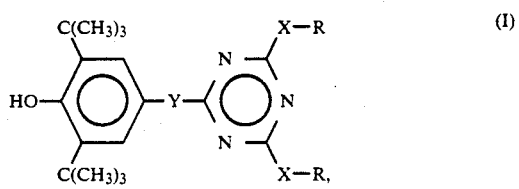

in which each R is, independently from the other, a monovalent hydrocarbon group and X and Y are each, independently from the others, a divalent group or atom selected from the class consisting of —NH—, —S— and —O—.

The amount of the adjuvant compound added to the organosilicon compound is in the range from 0.01 to 5% or, preferably, from 0.02 to 1% by weight based on the organosilicon compound.

DETAILED DESCRIPTION OF THE PREFERRED EMBODIMENTS

As is described above, the method of the invention is very simple and can be performed at low costs since a quite high and lasting effect of coloring prevention can be obtained merely by admixing the organosilicon compound with a small amount of a specified aromatic compound as an adjuvant. The organosilicon compound admixed with the adjuvant is quite stable and never colored even at an elevated temperature of 50° C. or higher or under irradiation with intense light.

The adjuvant compound is an aromatic compound represented by the above given general formula (I), in which each R is, independently from the other, a monovalent hydrocarbon group and X and Y are each, independently from the others, a divalent group or atom selected from the class consisting of —NH—, —S— and —O—.

Examples of the aromatic compound suitable as the adjuvant to the organosilicon compound according to the invention include those expressed by the following structura formulas:

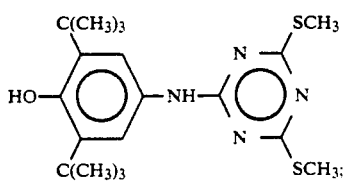

-continued

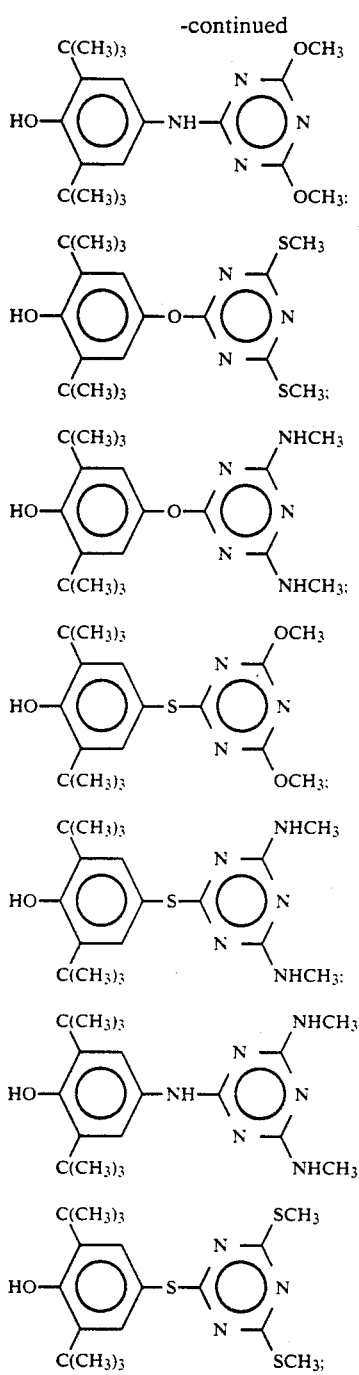

and

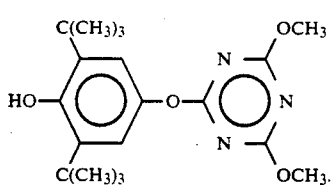

Although all of the above named aromatic compounds have a methyl group as one of the groups denoted by R in the general formula (I), these methyl groups can be replaced with other alkyl groups such as ethyl, propyl, butyl, pentyl, hexyl, octyl, undecyl and heptadecyl groups.

The amount of the adjuvant compound added to the organosilicon compound is usually in the range from 0.01 to 5% by weight or, preferably, from 0.02 to 1% by weight based on the organosilicon compound although the exact amount thereof should be adequately selected in consideration of the balance between the cost by the adjuvant and the desired effect of coloring prevention.

In the following, the method of the invention is illustrated in more detail by way of examples and comparative examples.

EXAMPLE 1

A 50:50 by weight mixture of methyl alcohol and a hydrochloride of an amino-containing trimethoxy silane compound N-3-(trimethoxysilyl)propyl-N'-benzyl ethylenediamine was admixed with an aromatic adjuvant compound of the formula

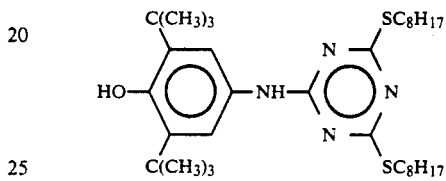

in an amount of 0.005%, 0.05%, 0.1% or 0.5% by weight and each of the mixtures was taken in a colorless and transparent glass bottle and kept standing with hermetic sealing in a room at 20° C. for a length of time up to 30 days to be visually inspected at intervals for the change of color which was initially very slightly yellowish. The results were that, while substantially no change was noted in the color of the silane compound with admixture of the adjuvant compound in an amount of 0.05% by weight or larger, the silane compound with admixture of 0.005% by weight of the adjuvant compound turned light brown after 14 days of storage and turned brown after 30 days of storage although no color change was noted thereof after 7 days of storage. When the same organosilicon compound as above as such was subjected to the same storage test without admixture of the adjuvant compound, the compound turned brown already after 7 days of storage.

EXAMPLE 2

The experimental procedure was substantially the same as in Example 1 described above except that the adjuvant compound added to the organosilicon compound in Example 1 was replaced with each 0.1% by weight of either one of the compounds expressed by the following formulas:

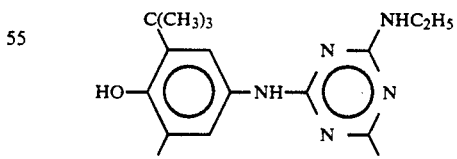

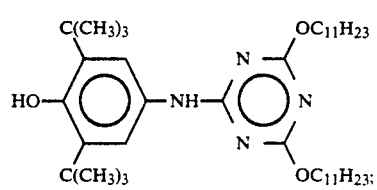

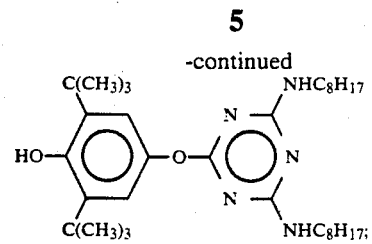

and

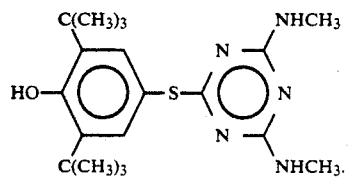

The results of the visual inspection of coloring of the mixtures after storage undertaken in the same manner as in Example 1 were that substantially no change was found in each of the mixtures after 30 days of storage.

COMPARATIVE EXAMPLE 1

The experimental procedure was substantially the same as in Example 1 except that the adjuvant compound was replaced with each 0.1% by weight of one of the six aromatic compounds expressed by the formulas given below:

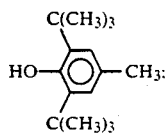

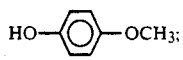

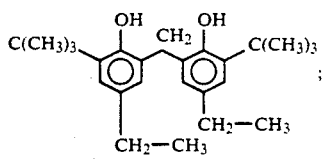

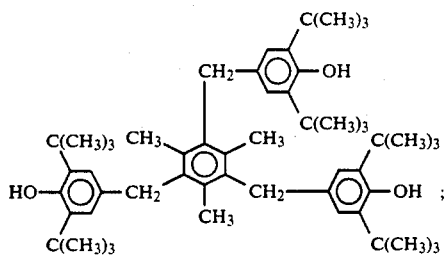

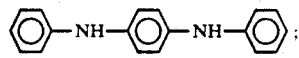

and

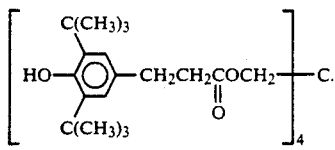

The results of the coloration test by storage were that all of the mixtures, which were pale yellow before the start of the storage test with an exception of the mixture admixed with the fifth compound, i.e. N,N'-diphenyl-1,4-phenylenediamine, which was brown already at the start, turned brown already after 7 days of storage.

EXAMPLE 3

1,1,3,3-Tetramethyl-1,3-di(3-aminopropyl) disiloxane was admixed with 0.1% by weight of an adjuvant compound expressed by the formula

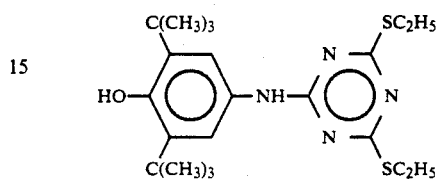

and the mixture, which was clear and colorless, was kept standing at 80° C. for a length of time up to 90 days in a hermetically sealed glass vessel. The result was that absolutely no appearance of color was found even after 90 days of storage.

For comparison, the same organosilicon compound without admixture of the adjuvant compound was subjected to the same storage test as above to find that the compound turned pale yellow after 60 days of storage with substantially no further changes in color thereafter.

EXAMPLE 5

Trimethoxy 3-methacryloxypropyl silane was admixed with 1% by weight of an adjuvant compound expressed by the formula

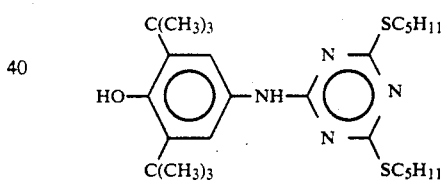

and an aluminum hydroxide powder was thoroughly blended with 1% by weight of the silane mixture followed by a heat treatment at 100° C. for 1 hour. The pure-white aluminum hydroxide powder after the above mentioned treatment was kept standing at 50° C. in an atmosphere of 80% relative humidity for a length of time up to 14 days to record the changes in color. The result was that absolutely no color change was found in the powder.

For comparison, the same silane treatment of the aluminum hydroxide powder and storage test of the treated powder as above were undertaken excepting omission of the adjuvant compound to the silane or replacement of the adjuvant compound with the same amount of 2,6-di(tert-butyl)-p-cresol. The results of the storage test of the aluminum hydroxide powders were that each of the powders turned light yellow already after 3 days of storage but subsequently without substantial further changes in color.

What is claimed is:
1. A method for the prevention of coloration of an organosilicon compound, which is liquid at room temperature, which comprises: admixing the organosilicon compound with, as an adjuvant, an aromatic compound represented by the formula

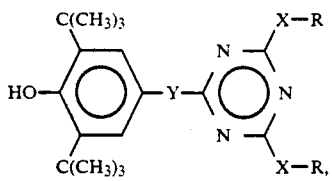

in which each R is, independently from the other, a monovalent hydrocarbon group and X and Y are each, independently from the others, a divalent group or atom selected from the class consisting of —NH—, —S— and —O—, in an amount in the range from 0.01 to 5% by weight based on the organosilicon compound.

2. The method for the prevention of coloration of an organosilicon compound as claimed in claim 1 in which the amount of the adjuvant compound added to the organosilicon compound is in the range from 0.02 to 1% by weight based on the organosilicon compound.

3. The method for the prevention of coloration of an organosilicon compound as claimed in claim 1 in which the group denoted by R in the formula representing the adjuvant compound is a methyl group.

4. The method for the prevention of coloration of an organosilicon compound of claim 1 wherein the adjuvant is a compound of one of the following formulae:

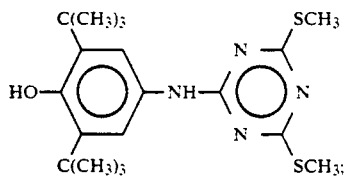

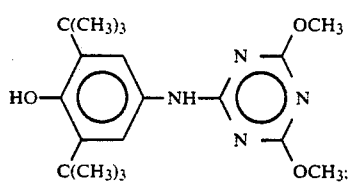

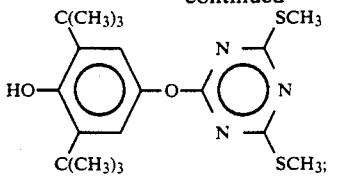

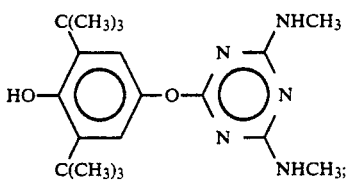

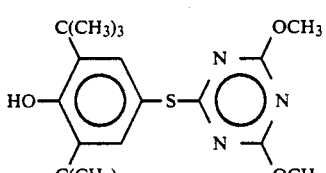

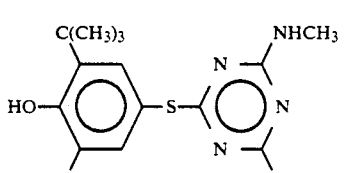

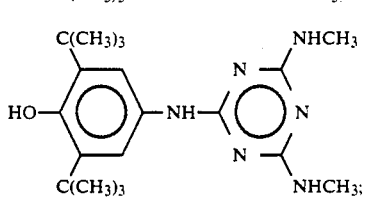

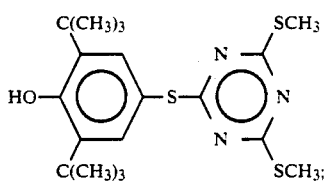

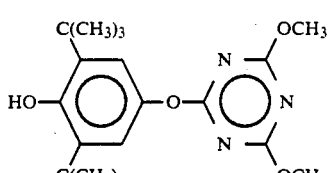

or mixtures thereof.

5. The method for the prevention of coloration of an organosilicon compound of claim 1 wherein each R is independently a methyl, ethyl, propyl, butyl, pentyl, hexyl, octyl, undecyl or heptadecyl group.

* * * * *